(12) United States Patent  
Higure et al.

(10) Patent No.: US 7,848,405 B2  
(45) Date of Patent: Dec. 7, 2010

(54) COMMUNICATION SYSTEM (75) Inventors: Kinichi Higure, Kodaira (JP); Hideki Aridome, Kodaira (JP)

(73) Assignee: Hitachi Kokusai Electric, Inc., Tokyo (JP)

( * ) Notice: Subject to any disclaimer, the term of this patent is extended or adjusted under 35 U.S.C. 154(b) by 671 days.

(21) Appl. No.: 11/828,721

(22) Filed: Jul. 26, 2007

(65) Prior Publication Data  
US 2008/0037621 A1  Feb. 14, 2008

(30) Foreign Application Priority Data  
Aug. 4, 2006  (JP) ............................. 2006-212715

(51) Int. Cl.  
*H03H 7/30* (2006.01)  
*H03H 7/40* (2006.01)  
*H03K 5/159* (2006.01)

(52) U.S. Cl. .................. 375/233; 375/232; 375/231; 375/230; 375/350; 708/322; 708/323

(58) Field of Classification Search ............... 375/231, 375/232, 233, 234, 235, 350; 708/322, 323  
See application file for complete search history.

(56) References Cited  
U.S. PATENT DOCUMENTS  
5,566,210 A * 10/1996 Saito et al. ................. 375/329

2008/0123791 A1  5/2008  Majima  
2009/0202025 A1  8/2009  Majima

FOREIGN PATENT DOCUMENTS

| JP | 5091001 | 4/1993 |
|----|---------|--------|
| JP | 8186523 | 7/1996 |
| JP | 9186634 | 7/1997 |
| JP | 2006033015 | 2/2006 |
| JP | 2006101382 | 4/2006 |

* cited by examiner

*Primary Examiner*—Phuong Phu  
(74) *Attorney, Agent, or Firm*—Brundidge & Stanger, P.C.

(57) ABSTRACT

Forward and backward equalization processes are effectively used in a communication system for equalizing a received signal of a frame including a known symbol part. The known symbol part is provided in a position other than both ends of the frame. An equalization filter unit acquires a signal of an equalization process result by performing an equalization filter process based on a signal serving as an equalization process target and a tap gain coefficient. An update unit updates the tap gain coefficient using a predefined algorithm. A first or second transmission unit transmits a received signal posterior or prior to the known symbol part to a first or second memory in a forward direction or reverse order. A first or second control unit performs a forward or backward equalization filter process with the equalization filter unit by receiving memory content transmitted from the first or second transmission unit in the forward direction or reverse order and employing a total or part of the known symbol part contained in the memory content as the equalization process target.

14 Claims, 6 Drawing Sheets

COMMUNICATION SYSTEM

BACKGROUND

1. Field of the Invention

The present invention generally relates to a communication system for performing an equalization process, and more particularly to a communication system for effectively employing a forward equalization process and a backward equalization process and a communication system for realizing better convergence in an equalization process, for example, even when the number of symbols of a synchronization word is small.

2. Related Art

For example, in digital wireless terminal devices for land mobile telecommunications, it is desirable to use a Recursive Least Squares (RLS) algorithm in which the pull-in speed of a tap gain is fast and tap gain coefficients are sufficiently converged in 10 symbols since a propagation channel varies at fast speed when a decision feedback equalizer is introduced to compensate for distortion of a received signal due to the effect of delayed waves, particularly the digital wireless terminal devices move at fast speeds.

However, since the RLS algorithm has a problem in that the number of multiplications increases in proportion to a square of the number of taps of an adaptive filter, a computation amount significantly increases to use a complex determinant and the like in calculation, and double precision floating point computation is required, it is difficult for a fixed point Digital Signal Processor (DSP) to perform a process at low power consumption and low cost and it is difficult for the RLS algorithm to be mounted in a portable terminal wireless device.

On the other hand, a Least Mean Square (LMS) algorithm exhibits a relatively good convergence characteristic as a computation amount is reduced in proportion to the number of taps of the adaptive filter. The LMS algorithm is known as a tap gain update algorithm of a linear or non-linear equalizer.

Since the LMS algorithm controls the tap gain to gradually approach an optimal tap gain in which a mean square value of errors is minimized, at least 30 to 50 symbols are required for coefficient convergence. However, the LMS algorithm is regarded as a representative adaptive algorithm in terms of a stability level and a computation amount. To mount the LMS algorithm in a signal processor, a computation amount is reduced, a convergence time of tap gain coefficients is shortened at the time of a training operation, or the number of symbols required for the training operation is reduced.

Examples of related art are as follows:

Patent Document 1 Japanese Patent Publication No. 2004-172724;

Patent Document 2 Japanese Patent Publication No. 2004-297536;

Patent Document 3 Japanese Patent Publication No. 2003-46415;

Non-Patent Document 1 ARIB STD-T61 "Narrow-Band Digital Communication System (SCPC/FDMA)," Association of Radio Industries and Businesses; and Non-Patent Document 2 ARIB STD-T79 "Local Digital Communication System," Association of Radio Industries and Businesses.

As described above, the LMS algorithm whose process is simple in terms of the stability and the computation amount requires 30 to 50 symbols in a synchronization word for coefficient convergence.

However, in many mobile wireless standards such as ARIB STD-T79 (Non-Patent Document 2) and the like, a synchronization word available for training has only 10 symbols.

Now, the above problems will be described in detail.

FIGS. 4A and 4B illustrate structural examples of frames used for a conventional digital wireless communication. FIG. 4A illustrates a structural example of a frame for a control channel or a communication channel, and FIG. 4B illustrates a structural example of a frame for a synchronization burst.

One frame is constructed with symbols 41, 51 of a synchronization word sequence (SW) and information (DATA) symbols 42a, 42b, 52a, 52b. For example, the symbols 41, 51 of the synchronization word sequence (SW) are arranged at the center (or almost center) and the information (DATA) symbols 42a, 42b, 52a, 52b are arranged before and after the symbols 41, 51 of the synchronization word sequence (SW).

The synchronization word sequence (SW) 41 for the control channel or the communication channel is 10 symbols, and the synchronization word sequence (SW) 51 for the synchronization burst is 16 symbols.

Multiple frames as described above are continuously wirelessly communicated.

An embodiment as described below will be described with reference to FIG. 4. For convenience of explanation, FIG. 4 will be referred to. However, the present invention is not limited to FIG. 4.

Figure 6:
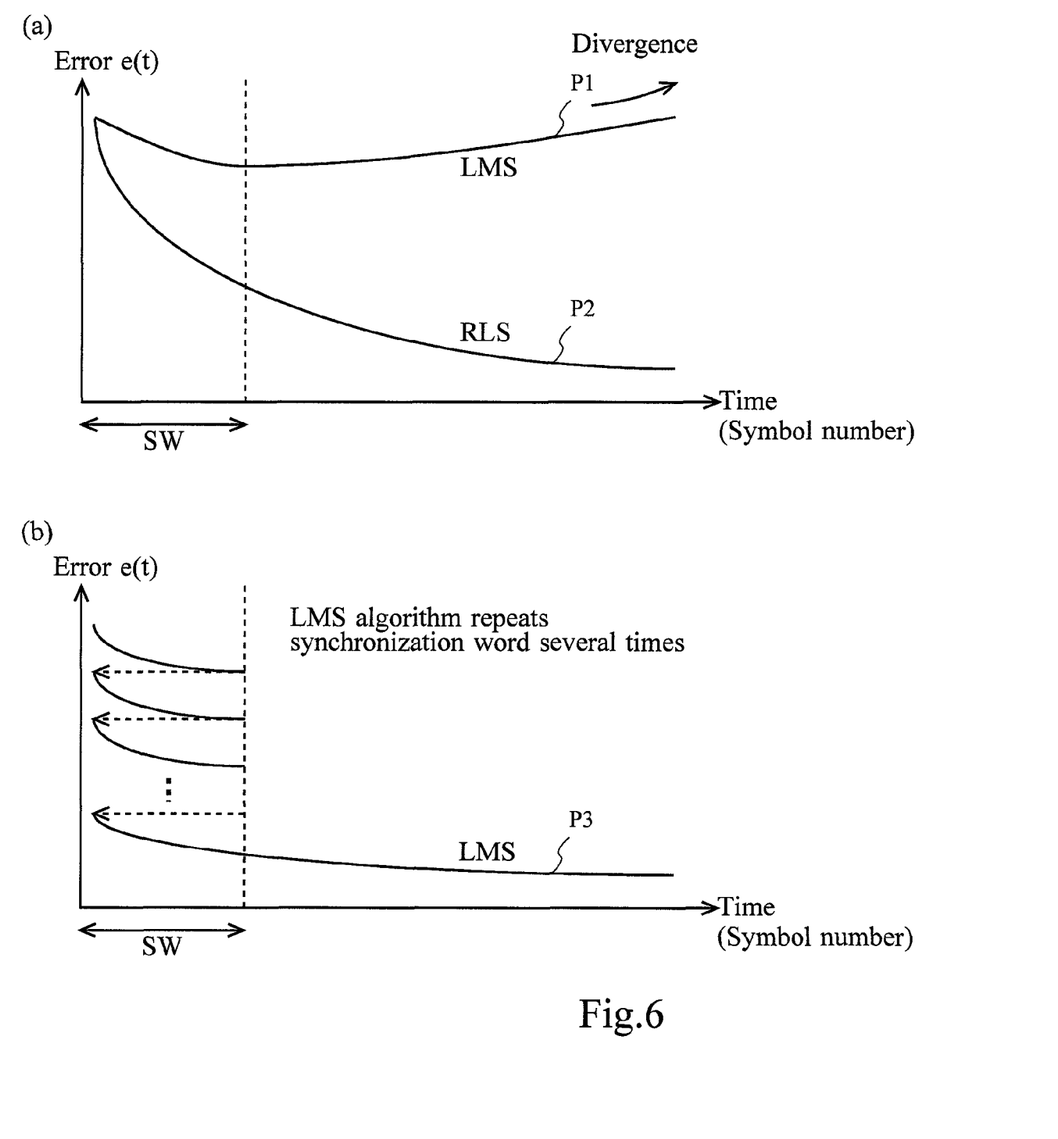
FIG. 6A illustrates an example of characteristics when a conventional algorithm is used.
FIG. 6B illustrates an example of characteristics when an algorithm in accordance with an embodiment of the present invention is used.

FIG. 6A illustrates an example of a characteristic P1 of an error e(t) in the case where an equalization process is performed using a conventional LMS algorithm and an example of a characteristic P2 of an error e(t) in the case where an equalization process is performed using a conventional RLS algorithm. In a graph, the horizontal axis represents the time (symbol number) and the vertical axis represents the error e(t). In this example, the equalization process is performed using the symbols 41, 51 of the synchronization word sequence (SW) in a time band of the symbols 41, 51 of the synchronization word sequence (SW). The equalization process is performed on the basis of blind equalization (or equalization based on only information symbols) in a time band of the information (DATA) symbols 42a, 42b, 52a, 52b.

Sufficient convergence cannot be achieved when the synchronization word is set to 10 symbols and the like in the equalization process of the communication system using the LMS algorithm requiring 30 to 50 symbols for convergence as illustrated in FIG. 6A. In this state, there is a problem in that divergence occurs when blind equalization (or equalization based on only the information symbols) is performed.

An improvement is required to perform an effective equalization process in the frame structures as illustrated in FIGS. 4A and 4B.

SUMMARY

The present invention has been designed to address at least the above problems. An object of the present invention is to provide a communication system that can perform an effective equalization process in the frame structures as illustrated in FIGS. 4A and 4B by effectively employing a forward equalization process and a backward equalization process.

Another object of the present invention is to provide a communication system that can realize better convergence in an equalization process, for example, even when the number of symbols of a synchronization word is small.

To accomplish the above and other objects, a communication system in accordance with the present invention performs an equalization process for a received signal constructed with a frame including a known symbol part.

That is, the known symbol part is provided in a position (or internal position) other than both ends of the frame.

In the communication system, an equalization filter unit acquires a signal of an equalization process result by performing an equalization filter process based on a signal serving as an equalization process target and a tap gain coefficient. At this time, an update unit updates the tap gain coefficient used by the equalization filter unit by using a predefined algorithm. A first transmission unit transmits (or stores) a received signal posterior to the known symbol part included in the frame constructing the received signal (for example, a signal including a total or part of a known symbol part and a subsequent information part) to a first memory in a forward direction. A second transmission unit transmits (or stores) a received signal prior to the known symbol part included in the frame constructing the received signal (for example, a signal including a total or part of a known symbol part and a previous information part) to a second memory in reverse order. A first control unit performs a forward equalization filter process with the equalization filter unit by receiving memory content transmitted by the first transmission unit in the forward direction and employing a total or part of the known symbol part included in the memory content as the equalization process target. A second control unit performs a backward equalization filter process with the equalization filter unit by receiving memory content transmitted by the second transmission unit in the reverse order and employing a total or part of the known symbol part included in the memory content as the equalization process target.

Accordingly, when a known symbol part is included inside a frame, for example, as in a frame in which an information part, a known symbol part and an information part are arranged side by side, an effective equalization process can be performed by effectively employing a forward equalization process and a backward equalization process. Specifically, in the forward equalization process and the backward equalization process, a similar transmission process can be performed, a similar equalization filter process can be performed, and their process programs and the like can be common.

In the first memory and the second memory, for example, individual memories may be used or a storage area of the same memory may be common.

In the first transmission unit and the second transmission unit, for example, individual function sections may be constructed or a common function section may be constructed.

In the first control unit and the second control unit, for example, individual function sections may be constructed or a common function section may be constructed.

In the forward equalization process or the backward equalization process, for example, a total of a known symbol part included in a frame may be used in the equalization process or a part of the known symbol part included in the frame may be used in the equalization process.

For the frame structure, various structures may be used.

For the known symbol part, various parts may be used.

For the equalization filter process, various filtering processes based on tap gain coefficients may be used. For example, not only a received signal but also a predefined reference signal can be used. For the predefined reference signal, a signal of a symbol pattern corresponding to a known symbol part pre-stored in the memory can be used with respect to (a total or part of) the known symbol part, and a signal of a result of determining data of a signal of an equalization process result can be used with respect to an information symbol part.

The predefined algorithm is effective when a Least Mean Square (LMS) algorithm is used. Various algorithms such as a Recursive Least Squares (RLS) algorithm and like may be used.

In a scheme for updating a tap gain coefficient, for example, the tap gain coefficient can be updated such that a signal of an equalization process result obtained by the equalization filter process approaches an ideal signal (or a signal that is considered to be ideal).

In one structural example, a communication system in accordance with the present invention is constructed as follows.

That is, the first control unit performs the forward equalization filter process with the equalization filter unit by receiving the memory content transmitted by the first transmission unit in the forward direction and repeatedly employing the total or part of the known symbol part included in the memory content as the equalization process target a number of times, and the second control unit performs the backward equalization filter process with the equalization filter unit by receiving memory content transmitted by the second transmission unit in the reverse order and repeatedly employing the total or part of the known symbol part included in the memory content as the equalization process target a number of times.

Accordingly, tap gain coefficients to be used in the equalization filter process can be sufficiently converged by repeatedly employing the total or part of the known symbol part (for example, the same symbol part) included in the frame constructing the received signal a number of times and performing the equalization filter process. Thus, for example, the better convergence can be realized in the equalization process even when the number of symbols of the total or part of the known symbol part (for example, a total or part of the synchronization word) is small. Specifically, it is effective to use a short symbol part for (a total or part of) the known symbol part as in (a total or part of) a synchronization word of 10 symbols.

For example, a frame includes a known symbol part and an information symbol part. In this case, an equalization process for the information symbol part can be precisely performed by performing the equalization process for the information symbol part after tap gain coefficients are sufficiently converged by employing (a total or part of) a known symbol part a number of times.

The number of times of repeatedly employing (a total or part of) a known symbol part as an equalization process target may be variously used. For example, since the convergence of tap gain coefficients increases as the number of times increases and the overall processing time decreases as the number of times decreases, the number of times may be set by weighing the convergence and the overall processing time.

In one structural example, a communication system in accordance with the present invention is constructed as follows.

That is, the known symbol part included in the frame constructing the received signal is a symbol part of a synchronization word. The predefined algorithm is an LMS algorithm or an RLS algorithm.

Accordingly, when an equalization process is performed using the LMS algorithm or the RLS algorithm in a frame in which a symbol part of a synchronization word is included, the effective equalization process can be performed by effectively employing the forward equalization process and the backward equalization process. The better convergence can be implemented in the equalization process using the LMS algorithm or the RLS algorithm, for example, even when the number of symbols of a synchronization word corresponding to a known symbol part is small, by repeatedly employing a total or part of a symbol part of a synchronization word included in a frame to perform the equalization process.

In an equalization processing method in accordance with the present invention, the following structure performs an equalization process for a received signal constructed with a frame including a known symbol part.

That is, the known symbol part is provided in a position (or internal position) other than both ends of the frame.

A first transmission unit of the communication system transmits (or stores) a received signal posterior to the known symbol part included in the frame constructing the received signal (for example, a signal including a total or part of a known symbol part and a subsequent information part) to a first memory in a forward direction. A second transmission unit of the communication system transmits (or stores) a received signal prior to the known symbol part included in the frame constructing the received signal (for example, a signal including a total or part of a known symbol part and a previous information part) to a second memory in reverse order. A first control unit of the communication system acquires a signal of a forward equalization process result by receiving memory content transmitted by the first transmission unit in the forward direction, employing a total or part of the known symbol part included in the memory content as an equalization process target, and performing a forward equalization filter process based on a tap gain coefficient to be updated using a signal serving as the equalization process target and a predefined algorithm. A second control unit of the communication system acquires a signal of a backward equalization process result by receiving memory content transmitted by the second transmission unit in the reverse order, employing a total or part of the known symbol part included in the memory content as an equalization process target, and performing a backward equalization filter process based on a tap gain coefficient to be updated using a signal serving as the equalization process target and a predefined algorithm.

Accordingly, when a known symbol part is included inside a frame, for example, as in a frame in which an information part, a known symbol part and an information part are arranged side by side, an effective equalization process can be performed by effectively employing a forward equalization process and a backward equalization process.

In one structural example, the equalization process method in accordance with the present invention is constructed with the following structure.

That is, a combination unit of the communication system combines a signal of the forward equalization process result with a signal of the backward equalization process result and acquires a combination result as a signal of an equalization process result of one frame.

Accordingly, when the received signal of one frame can be acquired after the equalization process, it can be used for a subsequent process (for example, a process for determining received information and the like).

For example, when there is a part in which a signal of the forward equalization process result and a signal of the backward equalization process result are redundant, one side of the signals can be deleted such that the signals are not redundant.

As is apparent from the above description, the present invention can perform an effective equalization process by effectively employing a forward equalization process and a backward equalization process when a known symbol part is included in a frame like a frame in which an information part, a known symbol part and an information part are arranged side by side. Moreover, the present invention can implement the better convergence in the equalization process by repeatedly employing a total or part of a known symbol part included in a frame constructing a received signal as an equalization process target, for example, even when the number of symbols of a synchronization word corresponding to the known symbol part is small.

BRIEF DESCRIPTION OF THE DRAWINGS

The above and other features and advantages of the present invention will be more apparent from the following detailed description taken in conjunction with the accompanying drawings, in which.

DETAILED DESCRIPTION OF EMBODIMENTS

Embodiments of the present invention will be described with reference to the accompanying drawings.

Figure 1:
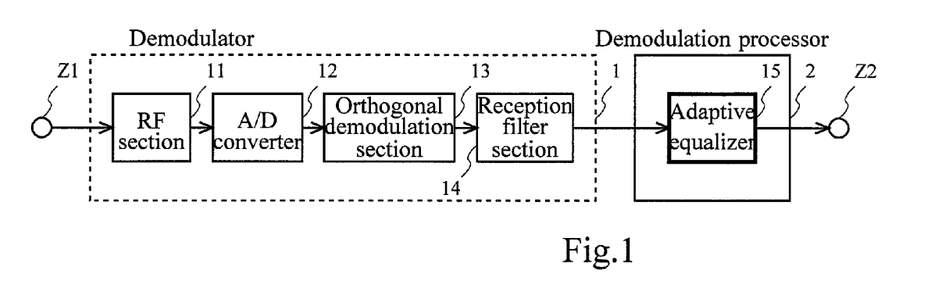
FIG. 1 illustrates a structural example of a receiver in accordance with an embodiment of the present invention.

FIG. 1 illustrates a structural example of a receiver provided in a wireless communication device of a wireless communication system in accordance with an embodiment of the present invention.

In this embodiment, the receiver is provided with a demodulator 1 and a demodulation processor 2 between an input terminal Z1 and an output terminal Z2.

The demodulator 1 is provided with a Radio Frequency (RF) section 11, an Analog to Digital (A/D) converter 12, an orthogonal demodulation section 13, and a reception filter section 14.

The demodulation processor 2 is provided with an adaptive equalizer 15.

In this embodiment, the wireless communication device of the wireless communication system performs wireless communication using frames as illustrated in FIGS. 4A and 4B.

Specifically, the frame as illustrated in FIG. 4A is constructed with information (DATA) symbols 42a including symbols from a position A to a position A', symbols 41 of a synchronization word sequence (SW) including symbols from a position B to a position B' subsequent to the information (DATA) symbols 42a, and information (DATA) symbols 42b including symbols from a position C to a position C' subsequent to the symbols 41 of the synchronization word sequence (SW).

The frame as illustrated in FIG. 4B is constructed with information (DATA) symbols 52a including symbols from a position A to a position D, symbols 51 of a synchronization word sequence (SW) including symbols from a position D' to a position B' subsequent to the information (DATA) symbols 52a, and information (DATA) symbols 52b including symbols from a position C to a position C' subsequent to the symbols 51 of the synchronization word sequence (SW). The position A' before the position B is illustrated along with the position B at which symbols between the position B and the position B' are 10 symbols.

In this embodiment, the frame structure as illustrated in FIG. 4A and the frame structure as illustrated in FIG. 4B use the common mark A, A', B, B', C, C' in the same symbol position. Alternatively, the frame structures (for example, the number of symbols) can be variously used.

Next, an example of the operation of the receiver in this embodiment will be described.

A signal wirelessly received via an antenna is input from the input terminal Z1 to the RF section 11 within the demodulator 1. In the RF section 11, a buffer amplifier performs power amplitude amplification and a mixer performs frequency conversion. Then, the A/D converter 12 converts the received signal of an analog signal into a digital signal. The orthogonal demodulation section 13 orthogonally demodulates the received signal converted into the digital signal and separates the demodulated signal into I and Q components of a baseband signal. The reception filter section 14 filters the I and Q components of the baseband signal and inputs the filtered I and Q components to the adaptive equalizer 15 within the demodulation processor 2.

The adaptive equalizer 15 performs an equalization process for the signal input thereto. The processed signal is output from the output terminal Z2.

Figure 2:
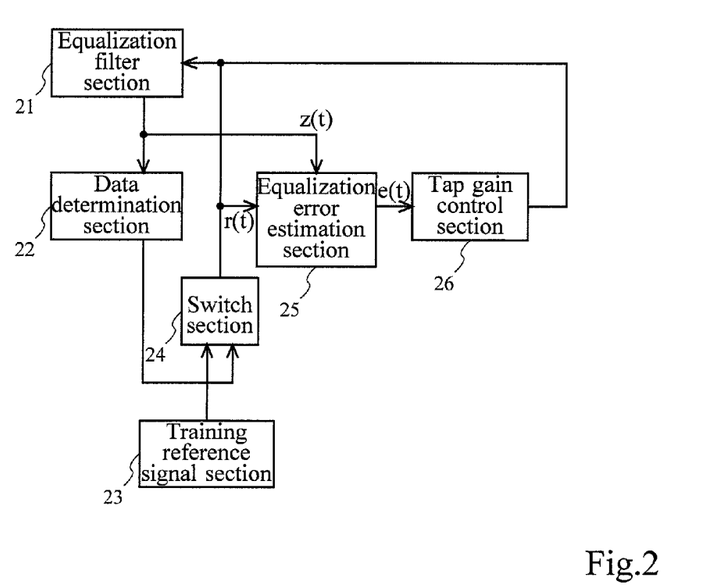
FIG. 2 illustrates a structural example of a decision feedback adaptive equalizer.

FIG. 2 illustrates a structural example of the adaptive equalizer 15 corresponding to the decision feedback adaptive equalizer in this embodiment.

In this embodiment, the adaptive equalizer 15 is provided with an equalization filter section 21, a data determination section 22, a training reference signal section 23, a switch section 24, an equalization error estimation section 25, and a tap gain control section 26.

Herein, the switch section 24 has a processor for connecting the equalization filter section 21 and the equalization error estimation section 25. The switch section 24 has a function for switching from the data determination section 22 and the training reference signal section 23. When an initial value is set, the switch section 24 performs a switching function for connecting the training reference signal section 23 to the equalization filter section 21 and the equalization error estimation section 25.

Figure 3:
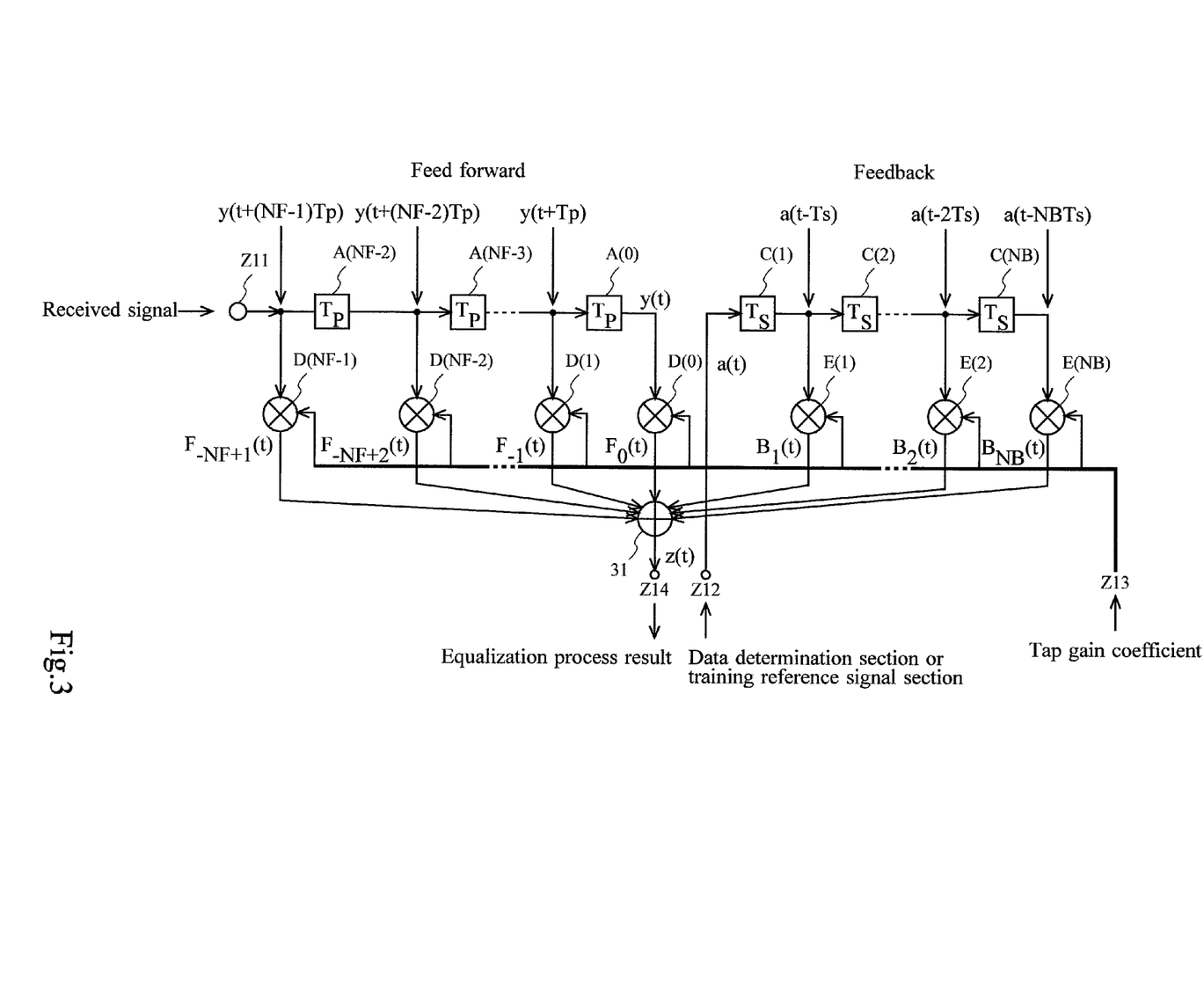
FIG. 3 illustrates a structural example of an equalization filter section.

FIG. 3 illustrates a structural example of the equalization filter section 21 in this embodiment.

In this embodiment, the equalization filter section 21 is provided with an input terminal Z11 of a received signal, an input terminal Z12 of an output from the data determination section 22 or an output from the training reference signal section 23, an input terminal Z13 of a tap gain coefficient, and an output terminal Z14 of an equalization process result.

In this embodiment, the equalization filter section 21 is provided with NF complex multipliers D(0) to D(NF−1) and (NF−1) 1-sample delay circuits A(0) to A(NF−2) with respect to a Feed Forward (FF) process.

In this embodiment, the equalization filter section 21 is provided with NB complex multipliers E(1) to E(NB) and NB 1-sample delay circuits C(0) to C(NB) with respect to a Feed Back (FB) process.

In this embodiment, the equalization filter section 21 is provided with a complex adder 31.

In this embodiment, multiple taps are provided in the FB system. Alternatively, one tap is provided in another structural example, a structure having one complex multiplier and one 1-sample delay circuit can be constructed.

An example of the operation of the adaptive equalizer 15 in this embodiment will be described with reference to FIGS. 2 and 3. In FIGS. 2 and 3, t represents the time.

In the equalization filter section 21, values $F_0(t)$ to $F_{-NF+1}(t)$ of NF number of FF tap coefficients serving as tap gain coefficients are input to the NF complex multipliers D(0) to D(NF−1), respectively.

A received signal input from the reception filter section 14 is input to the i-th complex multiplier D(i) (where i=0 to NF−1) via (NF−1−i) 1-sample delay circuits.

Herein, in the FF side, one 1-sample delay circuit uses a delay amount Tp and the received signal input to the i-th complex multiplier D(i) is denoted by y (t+i×Tp).

The respective complex multipliers D(0) to D(NF−1) complex multiply the input received signals by FF tap coefficients and then output complex multiplication results to the complex adder 31.

In the equalization filter section 21, values $B_1(t)$ to $B_{NB}(t)$ of NB number of FB tap coefficients serving as tap gain coefficients are input to the NB complex multipliers E(1) to E(NB), respectively.

After equalization, a signal of a determination value or a training reference signal is input to the j-th complex multiplier E(j) (where j=1 to NB) via j 1-sample delay circuits.

In this embodiment, when a known synchronization word sequence (SW) is inserted into a training interval for initial setting, the switch section 24 performs switching to the training reference signal section 23. For example, a signal of a known symbol sequence corresponding to a synchronization word sequence (SW) pre-stored in a memory serving as a training reference signal is input from the input terminal Z12. In an information transmission interval, the switch section 24 performs switching to the data determination section 22. A signal of a data determination result serving as a determination value after equalization (or equalization output determination value) is input from the input terminal Z12.

In this embodiment, not only a total of the synchronization word sequence (SW) can be set to the training reference signal, but also a part of the synchronization word sequence (SW) can be set to the training reference signal. The total or part of the synchronization word sequence (SW) is set in a forward direction in the case of forward equalization and in a reserve direction in the case of backward equalization.

Herein, in the FB side, one 1-sample delay circuit uses a delay amount Ts and the received signal input to the j-th complex multiplier E(j) is denoted by a(t−j×Ts). An input signal from the input terminal Z12 is denoted by a(t).

The respective complex multipliers E(1) to E (NB) complex multiply input signals by FB tap coefficients and then output complex multiplication results to the complex adder 31.

The complex adder 31 complex adds all signals (complex multiplication results) input from the multiple complex multipliers D(0) to D(NF−1) and E(1) to E(NB). An addition result is output from the output terminal Z14.

Herein, an input signal vector Y(t) constructed with data of each tap is expressed as shown in Equation (1).

A tap gain vector c(t) is expressed as shown in Equation (2).

A signal z(t) of the equalization process result output from the equalization filter section 21 is expressed as shown in Equation (3).

$$Y(t) = \begin{bmatrix} y(t+(NF-1)Tp), y(t+(NF-2)Tp), \ldots, \\ y(t), a(t-Ts), a(t-2Ts), \ldots, a(t-NBTs) \end{bmatrix}^T \quad (1)$$

$$c(t) = \begin{bmatrix} F_{-NF+1}(t), F_{-NF+2}(t), \ldots, \\ F_0(t), B_1(t), \ldots, B_{NB}(t) \end{bmatrix}^T \quad (2)$$

$$z(t) = \sum_{k=-NF+1}^{0} F_k(t)y(t-kTp) + \sum_{k=1}^{NB} B_k(t)a(t-kTs) = c^T(t)Y(t) \quad (3)$$

The output (equalization process result) from the equalization filter section 21 is input to the data determination section 22 and the equalization error estimation section 25.

The data determination section 22 estimates a transmitted symbol by determining the output z(t) from the equalization filter section 21. In this estimation, the data determination section 22 computes a square of a distance between an output from the equalization filter section 21 and a symbol from which the transmitted symbol is acquired. A symbol having the least square value is determined to be the reference signal.

The equalization error estimation section 25 computes an error e(t) between the output z(t) from the equalization filter section 21 and an ideal reference signal r(t) corresponding to the output from the switch section 24 and then outputs the computed error e(t) to the tap gain control section 26. The error e(t) is expressed as shown in Equation (4).

$$e(t)=r(t)-z(t) \quad (4)$$

As illustrated in FIGS. 4A and 4B, this embodiment uses a frame in which the synchronous word sequence (SW) 41, 51 corresponding to the known symbol sequence is added, besides the information (DATA) symbols 42a, 42b, 52a, 52b, for converging tap gain coefficients.

FIG. 4A illustrates a slot format in the case of a control channel or a communication channel. In this case, the synchronization word has 10 symbols. In this embodiment, a total of the 10 symbols can be used as a training interval.

Figure 4:
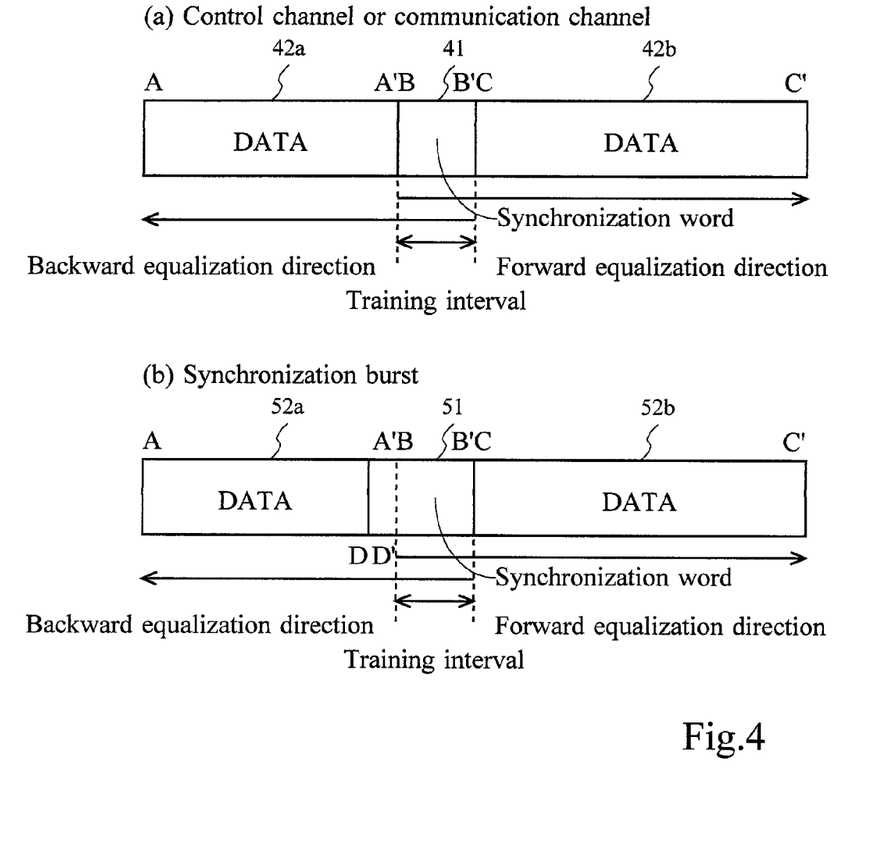
FIG. 4A illustrates a structural example of a frame used for digital wireless communication in a control channel or a communication channel.
FIG. 4B illustrates a structural example of a frame used for digital wireless communication in a synchronization burst.

FIG. 4B illustrates a slot format in the case of a synchronization burst. In this case, the synchronization word has 16 symbols. In this embodiment, 10 symbols at the rear of the 16 symbols (or the right side in FIG. 4) are used as a training interval.

Thus, when the equalization process is performed for the information (DATA) symbols 42b, 52b posterior to the symbols 41, 51 of the synchronization word sequence (SW), the forward equalization process is performed for symbols ranging from a symbol of the position B in the symbols 41, 51 of the synchronous word sequence (SW) to a symbol of the position C' (or the last position) in the information (DATA) symbols 42b, 52b. Herein, the position B of the symbols 41, 51 of the synchronization word sequence (SW) is the first position of the synchronization word sequence (SW) in FIG. 4A and is a position subsequent to the first six symbols of the synchronization word sequence (SW) in FIG. 4B.

When the equalization process is performed for the information (DATA) symbols 42a, 52a prior to the symbols 41, 51 of the synchronization word sequence (SW), the backward equalization process is performed for symbols ranging from a symbol of the position B' (or the last position) in the symbols 41, 51 of the synchronous word sequences (SW) to a symbol of the position A (or the first position) in the information (DATA) symbols 42a, 52a in a reverse direction.

In the standard of ARIB STD-T79 (Non-Patent Document 2), the frame as illustrated in FIG. 4A or 4B is constructed with 160 symbols. The frame as illustrated in FIG. 4A and the frame as illustrated in FIG. 4B are arranged such that the positions B' (or last position) of the symbols 41, 51 of the synchronization word sequences (SW) are the same as each other.

Since the received signal sequence of the slot format is a process target in this embodiment as described above, the backward equalization process is performed for the first half of the slot and the forward equalization process is performed for the second half of the slot.

For making the forward equalization process and the backward equalization process common to each other in this embodiment, a received signal from the position B of the training interval to the last position C' of the information (DATA) symbols 42b, 52b in the forward equalization process is transmitted to, for example, a memory different from a memory for storing a total of the received signal, in a forward sequence (or from the left to the right in FIG. 4). Similarly, a received signal from the position B' of the training interval to the first position A of the information (DATA) symbols 42a, 52a in the backward equalization process is transmitted to, for example, a memory different from a memory for storing a total of the received signal or the memory for the forward equalization process, in a reverse sequence (or from the right to the left in FIG. 4).

In this embodiment, the memory for storing the total of the received signal, the memory for storing a target of the forward equalization process, and the memory for storing a target of the backward equalization process are different from one another. Alternatively, for example, a part or total of the memory can be common and different storage areas of the same memory can be used.

Figure 5:
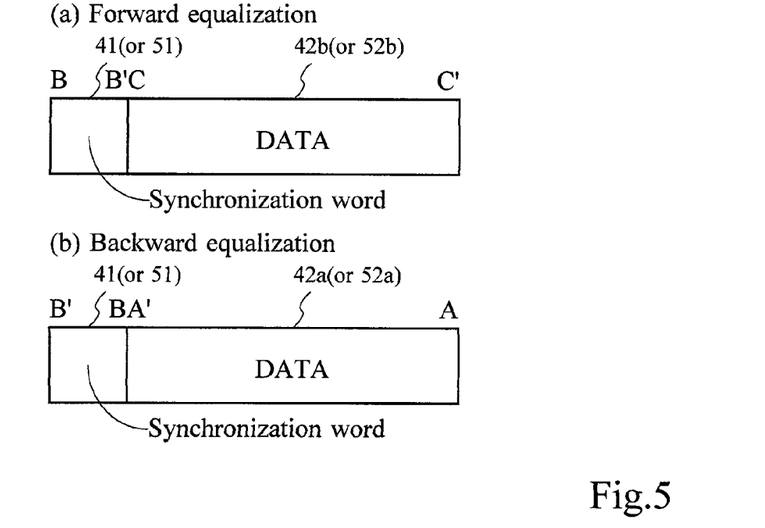
FIG. 5A illustrates an example of a transmission sequence of a received signal for forward equalization.
FIG. 5B illustrates an example of a transmission sequence of a received signal for backward equalization.

FIG. 5A illustrates an example of a received signal part serving as the target of the forward equalization process. Since the received signal part is stored in the memory for forward equalization, the forward equalization process is performed. In the forward equalization process of this embodiment, symbols of a part of the synchronization word sequence (SW) 51 (or a part between the position D' and the position A') in the frame as illustrated in FIG. 4B are not used.

FIG. 5B illustrates an example of a received signal part serving as the target of the backward equalization process. Since the received signal part is stored in the memory for backward equalization, the backward equalization process is performed. In the backward equalization process of this embodiment, symbols of a part of the synchronization word sequence (SW) 51 (or a part between the position A' and the position D') are included and processed in the information (DATA) symbols 52a in the frame as illustrated in FIG. 4B.

Herein, when the length of the synchronization word sequence (SW) (for example, 10 symbols) is equally set in the forward equalization process and the forward equalization process and the memory for storing the target of the forward equalization process and the memory for storing the target of the backward equalization process are differently set, for example, an equalization process program of a common Digital Signal Processor (DSP) is implemented and the common DSP can efficiently perform the forward equalization process and the backward equalization process by reading signals from the respective memories to perform the equalization processes.

Since an alignment sequence of the synchronization word sequence (SW) is reversed between the forward equalization process and the backward equalization process, training signals mapped to respective alignment sequences are set in the training reference signal section 23. Since only a part of the synchronization word sequence (SW) 51 in the frame as illustrated in FIG. 4B is used, a training signal for the associated part is set in the training reference signal section 23.

In another embodiment, all symbols or at least 11 symbols of the synchronization word sequence (SW) 51 in the frame as illustrated in FIG. 4B can be used, but the number of symbols of the synchronization word sequence (SW) 51 as illustrated in FIG. 4B can be different from that of the synchronization word sequence (SW) as illustrated in FIG. 4A.

In the forward equalization process or the backward equalization process in this embodiment, the equalization process is performed by repeatedly employing a part of the synchronization word sequence (SW) 41, 51 a number of times. In repeat training, the processes can be easily performed by first arranging parts of the synchronization word sequences (SW) serving as the targets of the forward equalization process and the backward equalization process as illustrated in FIGS. 5A and 5B.

In this embodiment, one training interval is a 10-symbol synchronization word interval (or a 10-symbol interval at the rear in the case of the synchronization burst). The coefficient convergence can be improved by performing, for example, 16 training processes for data of the same synchronization word.

The tap gain control section 26 updates tap gain coefficient values $F_{-NF+1}(t)$ to $F_0(t)$ and $B_1(t)$ to $B_{NB}(t)$ to be provided to the equalization filter section 21 using the LMS algorithm such that a mean square value of errors e(t) between an output z(t) from the equalization filter section 21 and an ideal reference signal r(t) is minimized.

A coefficient update process based on a complex LMS algorithm is performed on the basis of Equation (5). Herein, h(t) is a tap gain vector, u is a tap input vector, μ is a step size parameter (for example, μ=0.05), and e is an equalization error. In this embodiment, the tap gain vector c(t) as shown in Equation (2) is used as the tap gain vector h(t), the input signal vector Y(t) as shown in Equation (1) is used as the tap input vector u, and the error e(t) as shown in Equation (4) is used as the equalization error e.

$$h(t+1)=h(t)+\mu e^* u$$

$$h(t)=c(t)$$

$$u=Y(t)$$

$$e=e(t) \qquad (5)$$

Herein, since 30 to 50 symbols are conventionally required until tap gain coefficients are converged in the LMS algorithm, it is difficult to sufficiently converge the coefficients only in the synchronization word sequence (SW) 41, 51 of 10 symbols defined by many mobile wireless standards such as ARIB STD-T79 (Non-Patent Document 2) and the like.

In order to sufficiently converge the tap gain coefficients also in the 10 symbols corresponding to the synchronization word length determined by the standard in this embodiment, the equalization process is performed by employing the synchronization word sequence (SW) 41, 51 of the 10 symbols a number of times.

FIG. 6B illustrates an example of a characteristic P3 of an error e(t) when the equalization process (or each of the forward equalization process and the backward equalization process in this embodiment) is performed using the LMS algorithm in this embodiment. In a graph, the horizontal axis represents the time (or symbol number) and the vertical axis represents the error e(t).

As illustrated in FIG. 6B, the equalization process is performed by repeatedly employing the synchronization word sequence (SW) 41, 51 of the 10 symbols until tap gain coefficients of the adaptive equalizer 15 are sufficiently converged in this embodiment. A blind equalization process is performed such that the equalization process is performed using the information (DATA) symbols 42a, 42b, 52a, 52b after the tap gain coefficients are sufficiently converged. The adaptive equalizer 15 outputs an equalization process result to the output terminal Z2.

In this embodiment, the demodulation processor 2 combines a received signal part corresponding to a result obtained by performing the forward equalization process with a received signal part corresponding to a result obtained by performing the backward equalization process, thereby acquiring an equalization process result having the arrangement equal to that of the original received signal. In this case, since redundant parts (or symbol parts in the position B and the position B') are present between the received signal part as illustrated in FIG. 5A and the received signal part as illustrated in FIG. 5B, one side of the redundant parts is deleted.

In another structural example, a structure in which the forward equalization process result and the backward equalization process result are individually processed thereafter can be used.

The receiver of this embodiment receives a frame of a structure in which the information (DATA) symbols 42a, 52a, the symbols 41, 51 of the synchronization word sequence (SW), and the information (DATA) symbols 42b, 52b are arranged as illustrated in FIG. 4A or 4B. The receiver can effectively perform the overall equalization process for the frame of the above described structure by performing the forward equalization process for the information (DATA) symbols 42b, 52b posterior to the symbols 41, 51 of the synchronization word sequence (SW) and by performing the backward equalization process for the information (DATA) symbols 42a, 52a prior to the symbols 41, 51 of the synchronization word sequence (SW).

In the receiver of this embodiment, the adaptive equalizer 15 for compensating for delay distortion, for example, under a multipath paging environment, converges tap gain coefficients by performing a tap gain coefficient update process according to the LMS algorithm while repeatedly employing a signal of the associated synchronization word part included in the frame into which a known short synchronization word used for a reference signal to set an initial value is inserted.

Accordingly, the receiver of this embodiment can converge the tap gain coefficients of the adaptive equalizer 15 with the LMS algorithm by focusing on the number of symbols required to achieve the convergence to be solved by the LMS algorithm and repeatedly employing the 10-symbol synchronization word. For example, a transmission signal (signal received by the receiver) can be accurately estimated using a fixed-point computation scheme. Since 10 known symbols are sufficient also in the signal format within a frame (or slot) in this embodiment, data can be transmitted and received without degrading the transmission efficiency. This scheme conforms to many mobile wireless standards such as ARIB STD-T79 (Non-Patent Document 2) and the like.

There has been described a structure in which the forward equalization process and the backward equalization process are performed by repeatedly employing data of the same synchronization word sequence (SW) sixteen times when the LMS algorithm is used in this embodiment. In another structural example, it can be applied when the RLS algorithm is used. In this case, for example, three repeats and the like can be used when the forward equalization process or the backward equalization process is performed by repeatedly employing the data of the same synchronization word sequence (SW). Therefore, characteristics can be further improved when the RLS algorithm is used.

For example, the receiver of this embodiment can be applied to various devices such as a terminal device, a base station device, and the like.

In the receiver of the communication system of this embodiment, the demodulation processor 2 has an equalization filter unit constructed with a function of the equalization filter section 21 of the adaptive equalizer 15, a tap gain coefficient update unit constructed with a function of the data determination section 22, the training reference signal section 23, the switch section 24, the equalization error estimation section 25 or the tap gain control section 26 of the adaptive equalizer 15, a first memory constructed with a function of a memory for storing a target of the forward equalization process, a second memory constructed with a function of a memory for storing a target of the backward equalization process, a first transmission unit constructed with a function for transmitting the target of the forward equalization process to the first memory, a second transmission unit constructed with a function for transmitting the target of the backward equalization process to the second memory, a first control unit constructed with a function for performing the forward equalization process by unit of the adaptive equalizer 15, a second control unit constructed with a function for performing the backward equalization process by unit of the adaptive equalizer 15, and a combination unit constructed with a function for combining a signal of a forward equalization process result with a signal of a backward equalization process result.

Next, an example of a system to which the present invention can be applied will be described with reference to FIGS. 7 and 8.

Figure 7:
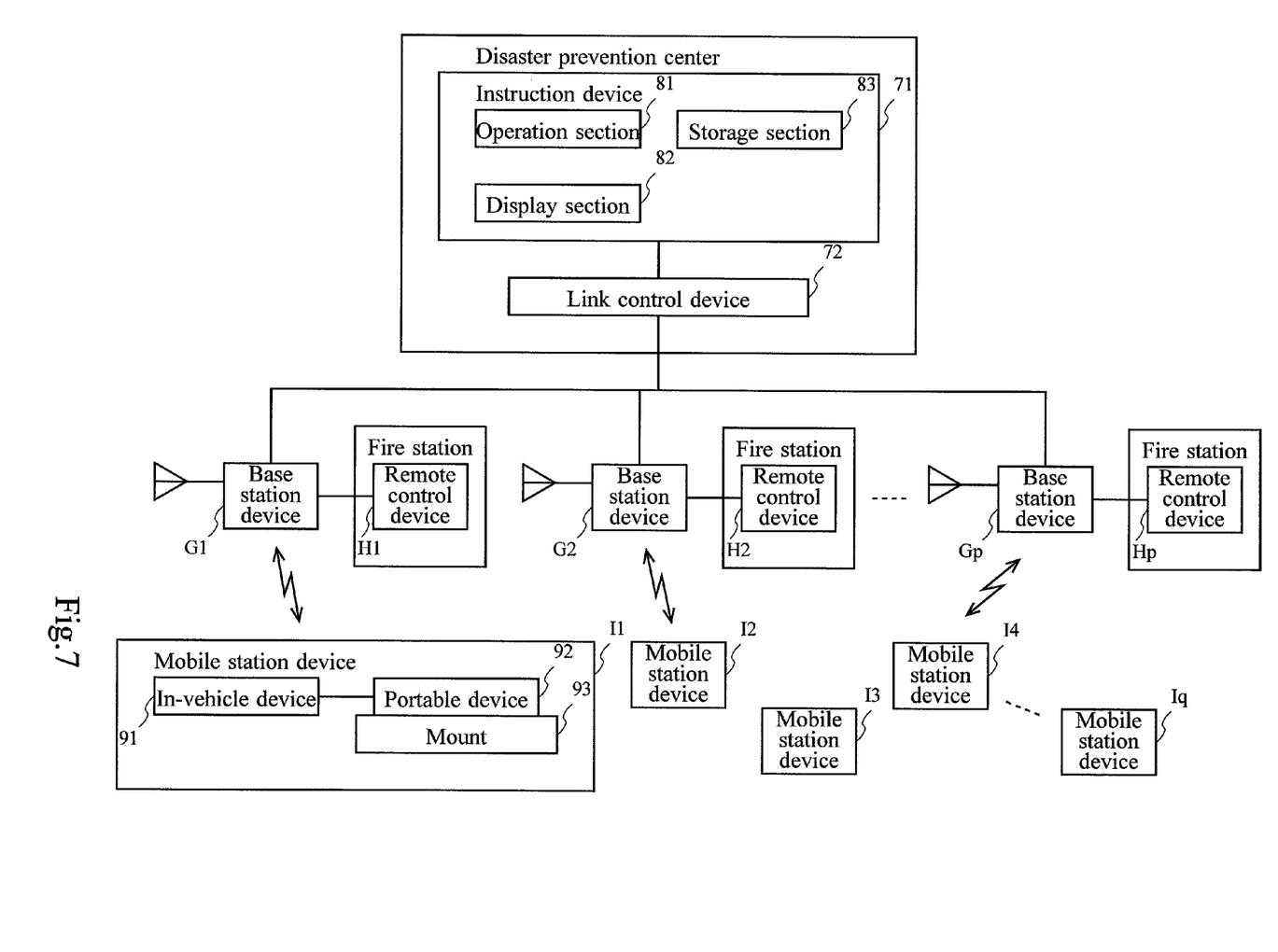
FIG. 7 illustrates a structural example of a fire-fighting digital wireless system.

FIG. 7 illustrates a structural example of a fire-fighting digital wireless system corresponding to an example of a disaster-prevention digital wireless system.

In this embodiment, the fire-fighting digital wireless system is provided with an instruction device (or instruction table) 71 having an operation section 81, a display section 82, and a storage section 83, a link control device (or wireless link control device) 72, p base station devices G1 to Gp, p remote control devices H1 to Hp, and q mobile station devices I1 to Iq.

The mobile station devices I1 to Iq are constructed with an in-vehicle device 91 and a portable device 92 and have a mount 93 for mounting the portable device 92, respectively.

In this embodiment, the fire-fighting digital wireless system can be used for local disaster prevention of prefectural and city governments such as the Tokyo metropolitan government and the like. In this embodiment, the instruction device 71 or the link control device 72 is installed in a disaster prevention center. The base station devices G1 to Gp are installed inside fire stations or in outdoor areas, for example, on the buildings, streets, mountains, or the like. The remote control devices H1 to Hp are installed inside the fire stations. The mobile station devices I1 to Iq are installed in vehicles such as fire engines, ambulance cars, or the like.

In each vehicle, for example, the in-vehicle device 91 or the mount 93 is installed and mounted in the associated vehicle. The portable device 92 can be carried by a person or can be placed on the mount 93.

Multiple systems as illustrated in FIG. 7 are provided. While any of the systems operates, another system is prepared for an alternate system. The overall operation can be continuous by operating the alternate system when the system in operation fails.

Various devices such as, for example, fixed, semi-fixed, portable and carriable devices and the like, can be used as lower devices communicating with the base station devices G1 to Gp.

Next, an operation of the fire-fighting digital wireless system in this embodiment will be summarized.

In the instruction device 71, the operation section 81 is operated by a person (or instructor). Various types of instructions or information are input to the operation section 81. The display section 82 displays and outputs various types of information serving as display targets on a screen. The storage section 83 constructed with a memory stores various types of information serving as storage targets.

The instructor can transmit various types of instructions from the instruction device 71 to lower devices (of the link control device 72, the base station devices G1 to Gp, the remote control devices H1 to Hp, or the mobile station devices I1 to Iq). Moreover, the instructor can view various types of information received by the instruction device 71 from the lower devices by displaying the information on the screen. Required information is stored in the storage section 83.

For example, the link control device 72 is connected to the instruction device 71 and the multiple base station devices G1 to Gp via a wired link. The link control device 72 relays communication between the instruction device 71 and the multiple base station devices G1 to Gp, and performs various control operations over a wireless link.

The base station devices G1 to Gp wirelessly communicate with the mobile station devices I1 to Iq located in areas where communication is possible and communicates with the remote control devices H1 to Hp connected by cable.

The remote control devices H1 to Hp communicate with the base station devices G1 to Gp connected by cable, and, for example, have functions similar to those of the mobile station devices, respectively. The remote control devices H1 to Hp are operated by a person (or officer).

The mobile station devices I1 to Iq wirelessly communicate with the base station devices G1 to Gp supporting the mobile station devices I1 to Iq.

Figure 8:
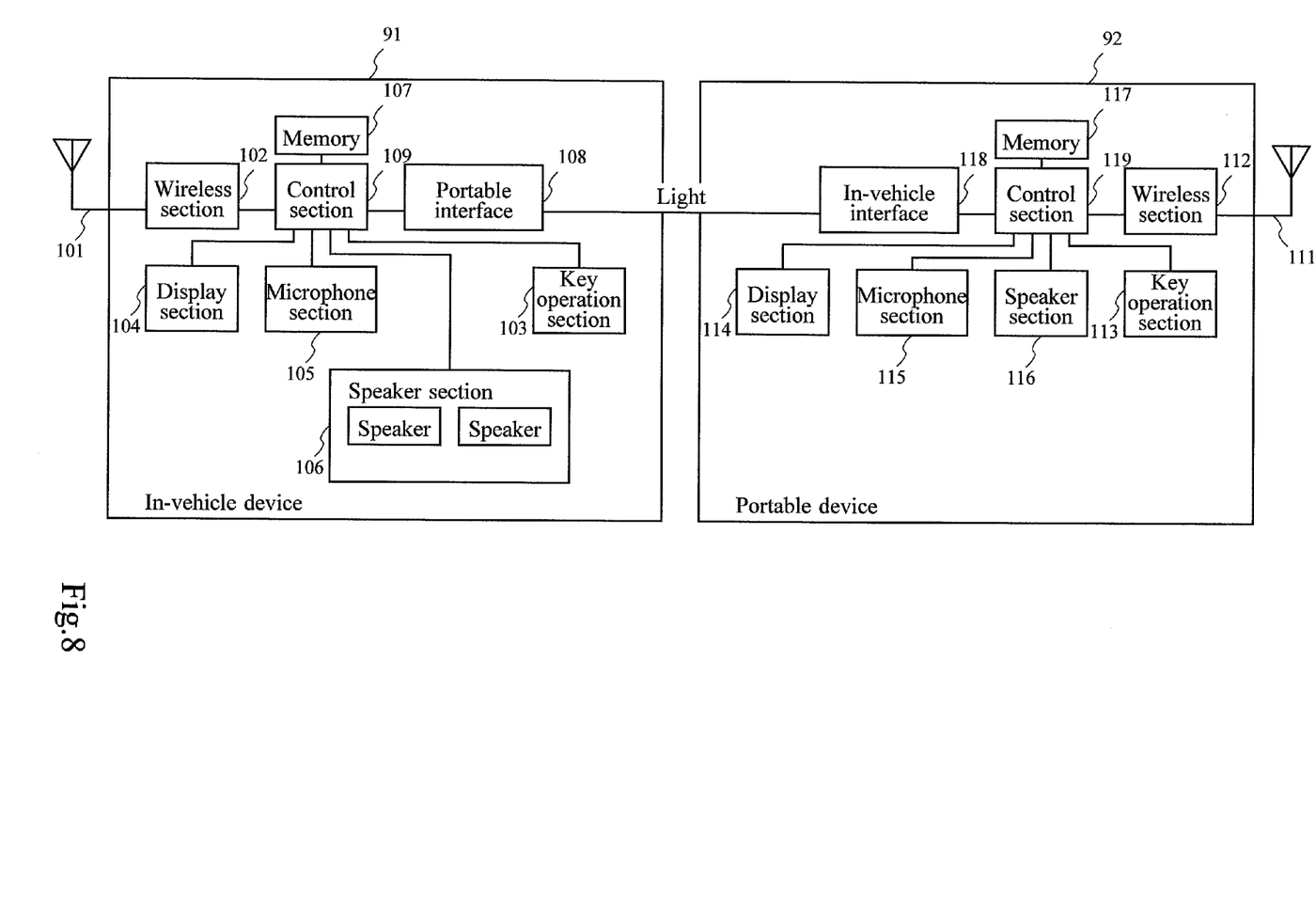
FIG. 8 illustrates a structural example of an in-vehicle device and a portable device.

FIG. 8 illustrates a structural example of the in-vehicle device 91 and a structural example of the portable device 92.

The in-vehicle device 91 is provided with an antenna 101, a wireless section 102, a key operation section 103, a display section 104, a microphone section 105 having a microphone, a speaker section 106 having, for example, two speakers, a memory 107, a portable interface 108, and a control section 109.

The portable device 92 is provided with an antenna 111, a wireless section 112, a key operation section 113, a display section 114, a microphone section 115 having a microphone, a speaker section 116 having, for example, two speakers, a memory 117, an in-vehicle interface 118, and a control section 119.

For example, the number of speakers is different between an internal processing function of the in-vehicle device 91 and an internal processing function of the portable device 92. However, the internal processing functions are roughly similar to each other.

In the in-vehicle device 91, the wireless section 102 wirelessly transmits a signal to or wirelessly receives a signal from the base station devices G1 to Gp via the antenna 101, the key operation section 103 receives a key operated by a person (or user), the display section 104 displays information for the user on a screen, the microphone section 105 receives sound (or voice) generated by the user or the like, the speaker section 106 outputs sound (or voice) to the user, the memory 107 stores call information (or ID information) constructed with, for example, a telephone number for calling, the portable interface 108 communicates with the in-vehicle interface 118 of the portable device 92, for example, using optical communication, and the control section 109 performs various control operations.

Similarly, in the portable device 92, the wireless section 112 wirelessly transmits a signal to or wirelessly receives a signal from the base station devices G1 to Gp via the antenna 111, the key operation section 113 receives a key operated by a person (or user), the display section 114 displays information for the user on a screen, the microphone section 115 receives sound (or voice) generated by the user or the like, the speaker section 116 outputs sound (or voice) to the user, the memory 117 stores call information (or Identifier (ID) information) constructed with, for example, a telephone number for calling, the in-vehicle interface 118 communicates with the portable interface 108 of the in-vehicle device 91, for example, using optical communication, and the control section 119 performs various control operations.

Herein, the same information is set as the call information (or ID information) stored in the memory 107 of the in-vehicle device 91 and the call information (or ID information) stored in the memory 117 of the portable device 92.

In the in-vehicle device 91 and the portable device 92, communication can be performed between the portable interface 108 and the in-vehicle interface 118 in a state in which the portable device 92 has been mounted on the mount 93. However, for example, communication is not performed between the portable interface 108 and the in-vehicle interface 118 in a state in which the portable device 92 is removed from the mount 93 and carried.

In this embodiment, the portable device 92 does not perform a special function in a state in which the portable device 92 is set (or mounted) on the mount 93. In this state, the in-vehicle device 91 performs all functions such as reception from the base station devices G1 to Gp, transmission to the base station devices G1 to Gp, key input, display output, voice input, voice output, and the like.

On the other hand, the portable device 92 performs all functions such as reception from the base station devices G1 to Gp, transmission to the base station devices G1 to Gp, key input, display output, voice input, voice output, and the like in a state in which the portable device 92 is removed from the mount 93. In this state, the in-vehicle device 91 performs only reception from the base station devices G1 to Gp, display output, and voice output. That is, the in-vehicle device 91 and the portable device 92 set the same call information (or ID information). The reception can be simultaneously performed by both the in-vehicle device 91 and the portable device 92, but the transmission can be performed by one side of the in-vehicle device 91 and the portable device 92 at a time.

The portable device 92 removed from the mount 93 can directly wirelessly communicate with the base station devices G1 to Gp without involving the in-vehicle portable 91. In this point, the portable device 92 is considered to be different from a cordless handset of an extension phone.

The in-vehicle device 91 or the portable device 92 detects a state in which the portable device 92 is set on or removed from the mount 93. The control section 109 or 119 of the in-vehicle device 91 or the portable device 92 sets an executable function (or non-executable function) in response to the detected state.

The in-vehicle device 91 has two speakers. For example, in a state in which the portable device 92 is removed from the mount 93, one speaker outputs voice of telephone conversation from the base station devices G1 to Gp to the portable device 92 and the other speaker outputs voice of telephone conversation from the portable device 92 to the base station devices G1 to Gp.

For example, when a member moves outside the associated fire engine while carrying the portable device 92 and another member waits inside the associated fire engine, in the case where the mobile station devices I1 to Iq are provided in fire engines and the like and the fire engines are located at the scene of a fire and the like, the other member can listen to telephone conversations between the portable device 92 and the base station devices G1 to Gp by listening to voice output from the in-vehicle device 91.

For example, downstream communication from the base station devices G1 to Gp to the mobile station devices I1 to Iq and upstream communication from the mobile station devices I1 to Iq to the base station devices G1 to Gp use different frequencies.

In communications between the base station devices G1 to Gp (for example, instruction devices 71) and the mobile station devices I1 to Iq, for example, a structure in which press talk communication is performed can be used, a structure in which simultaneous two-way communication is performed can be used as in conventional portable telephones, or a structure in which communication of another function is performed can be used. Alternatively, there can be used a structure in which notification information is transmitted from the base station devices G1 to Gp to the mobile station devices I1 to Iq and the mobile station devices I1 to Iq (automatically) output the information by receiving the information.

In the case of the fire engines, for example, the press talk communication is used and group communication (for example, group communication in a business link) is performed when the instruction device 71 calls the mobile station devices I1 to Iq of multiple fire engines, and press talk communication in the group is performed, such that the multiple fire engines can put out a fire at the same scene of a fire.

In the case of the ambulance cars, for example, communication is used as in a conventional telephone, and telephone communication can be performed by speech(or a call request) and listening.

For example, the in-vehicle device 91 and the portable device 92 can have a function in which wireless communication can be performed between the in-vehicle device 91 and the portable device 92 also at a distant place. In this case, for example, mutual telephone communication can be performed using the in-vehicle device 91 and the portable device 92 as in a transceiver when the portable device 92 is carried outside a vehicle in a dead zone such as a tunnel or the like.

Herein, a structure of a system or device in accordance with the present invention is not limited to those as described above. The present invention can use various structures. Moreover, the present invention can be provided as a method or scheme for executing a process in accordance with the present invention, a program for implementing the method or scheme, or a recordable medium for recording the program. Moreover, the present invention can be provided for various systems or devices.

Application fields of the present invention are not limited to those as described above. The present invention can be applied to various fields.

As various processes to be performed in a system or device and the like in accordance with the present invention, for example, a structure can be used which is controlled when a processor executes a control program stored in a Read Only Memory (ROM) with respect to hardware resources with a processor or memory and the like. For example, respective function unit for performing the associated process can be constructed with independent hardware circuits.

The present invention can be a computer readable recording medium of a floppy (trademark) disk or Compact Disc (CD)-ROM for storing the above described control program and the associated program (itself). A process in accordance with the present invention can be performed by inputting the associated control program from the associated recording medium to a computer and executing the input control program with a processor.

What is claimed is:

1. An equalizer for performing an equalization process for a received signal constructed with a frame including a known symbol part in which the known symbol part is provided in a position other than both ends of the frame, the equalizer comprising:

an equalization filter unit for acquiring a signal of an equalization process result by performing an equalization filter process based on a signal serving as an equalization process target and a tap gain coefficient;

an update unit for updating the tap gain coefficient used by the equalization filter unit by using a predefined algorithm;

a first transmission unit for transmitting a received signal posterior to the known symbol part included in the frame constructing the received signal to a first memory in a forward direction;

a second transmission unit for transmitting a received signal prior to the known symbol part included in the frame constructing the received signal to a second memory in reverse order;

a first control unit for performing a forward equalization filter process with the equalization filter unit by receiving content of the first memory and employing a total or part of the known symbol part included in the content as the equalization process target; and a second control unit for performing a backward equalization filter process with the equalization filter unit by receiving content of the second memory and employing a total or part of the known symbol part included in the content as the equalization process target, wherein a length of the known symbol part serving as the equalization process target is set to be identical in the forward equalization filter process and the backward equalization filter process, wherein the first memory and the second memory are differently provided, and wherein the forward equalization filter process and the backward equalization filter process are performed by a common control unit.

2. The equalizer of claim 1, wherein the first control unit performs the forward equalization filter process with the equalization filter unit by receiving the content of the first memory and repeatedly employing the total or part of the known symbol part included in the content as the equalization process target a number of times, and wherein the second control unit performs the backward equalization filter process with the equalization filter unit by receiving the content of the second memory and repeatedly employing the total or part of the known symbol part included in the content as the equalization process target a number of times.

3. The equalizer of claim 1, wherein the known symbol part included in the frame constructing the received signal is a symbol part of a synchronization word, and wherein the predefined algorithm is at least one of a Least Mean Square (LMS) algorithm and a Recursive Least Squares (RLS) algorithm.

4. The equalizer of claim 2, wherein the known symbol part included in the frame constructing the received signal is a symbol part of a synchronization word, and wherein the predefined algorithm is at least one of a Least Mean Square (LMS) algorithm and a Recursive Least Squares (RLS) algorithm.

5. The equalizer of claim 1, wherein the received signal is at least one of a signal of a control channel, a signal of a communication channel and a signal of a synchronization burst, wherein the signal of the control channel and the signal of the communication channel have an identical frame structure and have an identical length in a symbol part of a synchronization word included in a frame, wherein the signal of the synchronization burst has a frame structure different from those of the signal of the control channel and the signal of the communication channel and has a large length in a symbol part of a synchronization word included in a frame, and all the channels use a symbol part of a common length in line with a symbol part of a synchronization word included in a frame of the control channel signal and the communication channel signal for the known symbol part serving as the equalization process target.

6. The equalizer of claim 2, wherein the received signal is at least one of a signal of a control channel, a signal of a communication channel and a signal of a synchronization burst, wherein the signal of the control channel and the signal of the communication channel have an identical frame structure and have an identical length in a symbol part of a synchronization word included in a frame, wherein the signal of the synchronization burst has a frame structure different from those of the signal of the control channel and the signal of the communication channel and has a large length in a symbol part of a synchronization word included in a frame, and all the channels use a symbol part of a common length in line with a symbol part of a synchronization word included in a frame of the control channel signal and the communication channel signal for the known symbol part serving as the equalization process target.

7. The equalizer of claim 3, wherein the received signal is at least one of a signal of a control channel, a signal of a communication channel and a signal of a synchronization burst, wherein the signal of the control channel and the signal of the communication channel have an identical frame structure and have an identical length in a symbol part of a synchronization word included in a frame, wherein the signal of the synchronization burst has a frame structure different from those of the signal of the control channel and the signal of the communication channel and has a large length in a symbol part of a synchronization word included in a frame, and all the channels use a symbol part of a common length in line with a symbol part of a synchronization word included in a frame of the control channel signal and the communication channel signal for the known symbol part serving as the equalization process target.

8. An equalization processing method for use in a communication system for performing an equalization process for a received signal constructed with a frame including a known symbol part, comprising:

providing the known symbol part in a position other than both ends of the frame;

transmitting, by a first transmission unit of the communication system, a received signal posterior to the known symbol part included in the frame constructing the received signal to a first memory in a forward direction;

transmitting, by a second transmission unit of the communication system, a received signal prior to the known symbol part included in the frame constructing the received signal to a second memory in reverse order;

acquiring, by a first control unit of the communication system, a signal of a forward equalization process result by receiving content of the first memory, employing a total or part of the known symbol part included in the content as an equalization process target, and performing an equalization filter process based on a tap gain coefficient to be updated using a signal serving as the equalization process target and a predefined algorithm; and acquiring, by a second control unit of the communication system, a signal of a backward equalization process result by receiving content of the second memory, employing a total or part of the known symbol part included in the content as an equalization process target, and performing an equalization filter process based on a tap gain coefficient to be updated using a signal serving as the equalization process target and a predefined algorithm, wherein a length of the known symbol part serving as the equalization process target is set to be identical in the forward equalization filter process and the backward equalization filter process, wherein the first memory and the second memory are differently provided, and wherein the first control unit and the second control unit are common.

9. The equalization processing method of claim 8, further comprising:

combining, by a combination unit of the communication system, the signal of the forward equalization process result with the signal of the backward equalization process result and acquiring a combination result as a signal of an equalization process result of one frame.

10. A method of performing an equalization process in an equalizer for a received signal constructed with a frame including a known symbol part in which the known symbol part is provided in a position other than both ends of the frame, the method comprising the steps of:

acquiring a signal of an equalization process result by performing an equalization filter process based on a signal serving as an equalization process target and a tap gain coefficient;

updating the tap gain coefficient used by the equalization filter process by using a predefined algorithm;

transmitting a received signal posterior to the known symbol part included in the frame constructing the received signal to a first memory in a forward direction;

transmitting a received signal prior to the known symbol part included in the frame constructing the received signal to a second memory in reverse order;

performing a forward equalization filter process by receiving content of the first memory and employing a total or part of the known symbol part included in the content as the equalization process target; and performing a backward equalization filter process by receiving content of a second memory and employing a total or part of the known symbol part included in the content as the equalization process target, wherein a length of the known symbol part serving as the equalization process target is set to be identical in the forward equalization filter process and the backward equalization filter process, wherein the first memory and the second memory are differently provided, and wherein the first control unit and the second control unit are common.

11. The method of claim 10, wherein the step of performing the forward equalization filter process includes receiving the content of the first memory and repeatedly employing the total or part of the known symbol part included in the content as the equalization process target a number of times, and wherein the step of performing the backward equalization filter process includes receiving the content of the second memory and repeatedly employing the total or part of the known symbol part included in the memory content as the equalization process target a number of times.

12. The method of claim 10, wherein the known symbol part included in the frame constructing the received signal is a symbol part of a synchronization word, and wherein the predefined algorithm is at least one of a Least Mean Square (LMS) algorithm and a Recursive Least Squares (RLS) algorithm.

13. The method of claim 10, wherein the received signal is at least one of a signal of a control channel or signal of a communication channel and a signal of synchronization burst, wherein the signal of the control channel and the signal of the communication channel have an identical frame structure and have an identical length in a symbol part of synchronization word included in a frame, wherein the signal of the synchronization burst has a frame structure different from those of the signal of the control channel and the signal of the communication channel and has a large length in a symbol part of a synchronization word included in a frame, and all the channels use a symbol part of a common length in line with a symbol part of a synchronization word included in a frame of the control channel signal and the communication channel signal for the known symbol part serving as the equalization process target.

14. A receiver having an equalizer for performing an equalization process for a received signal constructed with a frame including a known symbol part in which the known symbol part is provided in a position other than both ends of the frame, the equalizer comprising:

an equalization filter unit for acquiring a signal of an equalization process result by performing an equalization filter process based on a signal serving as an equalization process target and a tap gain coefficient;

an update unit for updating the tap gain coefficient used by the equalization filter unit by using a predefined algorithm;

a first transmission unit for transmitting a received signal posterior to the know symbol part included in the frame constructing the received signal to a first memory in the same order as the received order;

a second transmission unit for transmitting a received signal prior to the known symbol part included in the frame constructing the received signal to a second memory in the reverse order against the received order;

a first control unit for performing a forward equalization filter process with the equalization filter unit by receiving content of the first memory which was transmitted in the same order as the received order by the first transmission unit and employing a total or part of the known symbol part included in the content as the equalization process target; and a second control unit for performing a backward equalization filter process with the equalization filter unit by receiving content of the second memory which was transmitted in the reverse order against the received order by the second transmission unit and employing a total or part of the know symbol part included in the content as the equalization process target, wherein the length of the known symbol part serving as the equalization process target is set to be identical in the forward equalization filter process and the backward equalization filter process, wherein the first memory and the second memory are differently provided, and wherein the first control unit and the second control unit are common.

* * * * *